(12) United States Patent
Donahue et al.

(10) Patent No.: US 6,957,685 B1
(45) Date of Patent: Oct. 25, 2005

(54) METHOD OF CLEANING AND OF HEAT TREATING LOST FOAM CASTINGS

(75) Inventors: Raymond J. Donahue, Fond du Lac, WI (US); Kevin R. Anderson, Fond du Lac, WI (US); Daniel D. Schingen, Fond du Lac, WI (US); Christopher J. Misorski, Fond du Lac, WI (US)

(73) Assignee: Brunswick Corporation, Fond du Lac, WI (US)

( * ) Notice: Subject to any disclaimer, the term of this patent is extended or adjusted under 35 U.S.C. 154(b) by 0 days.

(21) Appl. No.: 10/430,871

(22) Filed: May 7, 2003

(51) Int. Cl.[7] ............................ B22C 9/04; B22D 29/00
(52) U.S. Cl. .................. 164/34; 164/131; 164/132
(58) Field of Search ..................... 164/34, 131, 132

(56) References Cited

U.S. PATENT DOCUMENTS

| | | | |
|---|---|---|---|
| 4,854,368 A | * | 8/1989 | Vezirian |
| 5,014,764 A | * | 5/1991 | Garat |
| 5,058,653 A | * | 10/1991 | Garat |
| 5,088,544 A | * | 2/1992 | Garat |
| 5,161,595 A | * | 11/1992 | Garat |
| 5,960,851 A | * | 10/1999 | Donahue |
| 6,042,369 A | * | 3/2000 | Bergman et al. |

OTHER PUBLICATIONS

"Heat Treatment of Aluminum Casting Alloys for Vacuum Die Casting", Light Metal Age, Schneider and Feikus, 1998.*
"Solution Heat Treatment for AlSiMg Foundry Alloys", Liss Pederson, Apr. 1999.*
"Short Term Solution Heat Treating—The Industrial Application", Ray Donahue, 2001.*

* cited by examiner

Primary Examiner—Kuang Y. Lin
(74) Attorney, Agent, or Firm—Andrus, Sceales, Starke & Sawall, LLP; William D. Lanyi

(57) ABSTRACT

A method of cleaning and of heat treating lost foam castings utilizing a heated, fluidized sand bed is disclosed. The fluidized action of the sand, the movement of the casting through the sand and the heat of the bed, combine to remove residue coating resulting from the lost foam casting process from the casting.

22 Claims, 2 Drawing Sheets

METHOD OF CLEANING AND OF HEAT TREATING LOST FOAM CASTINGS

BACKGROUND AND SUMMARY OF THE INVENTION

The lost foam casting process may be utilized to cast complex metal articles, such as engine blocks. It is well documented that the lost foam casting process is an efficient and effective casting process for forming such articles. See U.S. Pat. Nos. 4,854,368; 5,014,764; 5,058,653; 5,088,544; 5,161,595 and 5,960,851.

In lost foam or evaporable foam casting, a pattern is produced from a polymeric foam material, such as polystyrene, and has a configuration identical to the metal article to be cast. A porous ceramic coating is applied to the outer surface of the pattern. One or more patterns are located within an outer vessel and a polymeric foam gating system connects each pattern to a sprue. The space between the patterns and the vessel is filled with a finely divided inert material, such as sand, and the sand also fills the internal cavities within the pattern.

In the lost foam casting process, molten metal is fed into the sprue and the heat of the molten metal acts to decompose or ablate the polymeric foam material of the gating system, as well as the pattern. The molten metal occupies the void created by ablation of the foam material, with the decomposition products of the foam passing through the porous ceramic coating of the pattern and becoming trapped within the interstices of the sand. Upon solidification of the molten metal, the resulting cast article has a configuration identical to the polymeric foam pattern.

One of the advantages of the lost foam casting process is that it is capable of forming complex internal passageways during casting, such as the internal passageways of an internal combustion engine. However, a significant disadvantage of the lost foam casting process is the difficulty of removal of the residual ceramic coating from the complex internal passageways of the casting. For this reason, lost foam casting is not used to a significant extent in the production of engine blocks because the presence of the residual ceramic coating adversely affects the performance of running engines.

As with most cast articles, it is desirable to heat treat articles after they are cast using the lost foam casting process. In general, heat treating is the process by which an alloy is elevated to a high temperature, thereby changing its microstructure to improve its properties. Through this thermal treatment, the resulting properties and performance of a component may be manipulated. Specifically, when dealing with aluminum silicon alloys, heat treatment changes the alloy's microstructure by spherodizing and coarsening eutectic silicon particles, and homogeneously redistributing precipitate forming elements in solid solution. It is known in the art that the heat-up rate and the time spent at the heat treatment temperature are important factors in obtaining the properties which will increase performance of a heat treated article.

Short term solution heat treating has been advanced by Franz Feikus in his 1998 paper published in Light Metal Age entitled "Heat Treatment of Aluminum Casting Alloys for Vacuum Die Casting," by Liss Pederson's book "Solution Heat Treatment of AlSiMg Foundry Alloys," and by Ray Donahue's 2001 paper delivered for the Worchester Polytechnic Institute Heat Treating Conference entitled "Short Term Solution Heat Treating—The Industrial Application." These publications indicate that short term solution heat treating provides the advantages of heat treatment with a minimal amount of time. However, because conventional short term heat treating processes utilize an air circulating furnace, a significant amount of time (up to 3.5 hours) is forfeited in heating the cast article to the required heat treatment temperature. Thus, conventional short term heat treatment processes do not effectively take advantage of the time that could be saved.

In accordance with the invention, the use of a heated, fluidized sand bed has been found to economically heat treat articles cast using the lost foam casting process while simultaneously efficiently and effectively removing the residual ceramic coating remaining from the lost foam casting process. The economy and efficiency of the invention is enhanced through the use of the heated, fluidized sand bed by significantly shortening the time for complex cast metal articles to reach appropriate heat treatment temperatures. The heated, fluidized sand bed contemplated for use in the present invention is described in U.S. Pat. No. 6,042,369, which is incorporated herein. The fluidized heat treatment beds, as described therein are very accurate, in so far as they deviate very little from the desired heat treatment temperature. This further enhances the efficiency of the treatment process. Additionally, when the heated, fluidized sand bed is utilized in conjunction with the lost foam casting process, further production efficiencies may be realized.

Unexpectedly, the fluidized action of the sand in heated fluidized sand beds has been found to clean the residual ceramic coating from complex cast articles to a degree that could not be realized with prior cleaning methods. Particularly, the inside passageways of complex castings, such as engine blocks, are now easily and sufficiently cleaned.

It has also been realized that the cleaning action of the heated, fluidized sand bed may be optimized by incorporating specifically shaped media. Tetrahedral shaped media has been found to optimize the cleaning action of the heated fluidized sand bed so that the cleaning time is not significantly longer than the optimized solution heat treating time.

Other factors also contribute to the excellent cleaning action of the present invention. Thermal shocking of the ceramic coating microcracks the coating aiding in its removal. The thermal shock propensity of a material is directly proportional to its thermal expansion coefficient as well as the temperature difference between the material in the bed and the atmospheric temperature. Further, the thermal shock propensity is inversely proportional to the material's thermal conductivity. When heat treating in a fluidized bed, a part is directly immersed in a hot fluidized sand. The residual ceramic coating may go from as low of a temperature as room temperature to as high as 1030° F. when placed in the sand. This large change in temperature thermally shocks the ceramic thereby microcracking the coating and aiding in its removal.

Interfacial stress also helps remove the ceramic coating. When a casting with a residual ceramic coating on a surface is heated extremely rapidly in a fluidized bed, the aluminum expands at a faster rate than the ceramic coating due to its higher coefficient of thermal expansion and higher thermal conductivity. This places the ceramic in a state of tension and builds high sheer stresses at the interface between the ceramic coating and the metal. The tensile stresses in the ceramic subsequently fracture the residual coating. Thus, the high sheer stresses at the interface serve to "spall" the coating from the surface of the aluminum part.

Finally, thermal decomposition of the ceramic coating occurs at high heat treatment temperatures. The accuracy of heat treatments in a fluidized bed makes it possible to heat treat at temperatures closer to the melting point of the aluminum in the casting. The ceramic coating used to coat the forms in the lost foam casting process typically contain a percentage of a polymeric binder as an additive. The ability to solution heat treat at a higher temperature over time decomposes the polymeric binder faster than is possible at lower temperatures.

Still another production efficiency may be realized when the heated, fluidized sand bed is utilized in conjunction with a lost foam casting process. As aforementioned, a lost foam casting process uses sand or other inert sand-like material to support and surround the polymeric foam pattern, including filling any complex internal passageways. Surprisingly, it has been discovered that the same sand used in lost foam casting may be used in the heated fluidized bed to heat treat and clean the castings. After the polymeric foam pattern has been ablated, and an article is cast using the lost foam casting process, a bonded sand cluster forms in the casting flask. The bonded sand cluster is formed when the polymeric foam material enters the interstices of the sand surrounding and supporting pattern during ablation of the pattern by the molten metal. The ablated polymeric foam material subsequently solidifies in the interstices of the sand, creating a bonded sand cluster around the newly formed cast article.

Transfer of the cluster, with much of the compact sand in place, directly into the heated fluidized sand bed creates several advantages. First, because the cast article contains heat energy from the casting process, it is possible to transfer the cluster at a temperature of approximately 700° F., instead of room temperature, allowing a faster heat-up to a heat treatment temperature of approximately 1000° F., creating energy savings and cost reduction. Second, the sand used in the lost foam casting process need not be reclaimed because the fluidized beds provides in situ removal of organic deposits formed through foam decomposition. Third, introduction of the cluster into the fluidized bed creates an alternate method to capture the emissions from the shake out of the bonded sand cluster.

The inventive process also provides an advantage for alloys that can be directly quenched from above the solvus temperature to avoid the need of heat treatment. For these alloys, aging may be done in the fluidized bath, while the action of the sand in the fluidized bed removes the residual ceramic coating from the internal passageways. Further, it is possible with the present invention, to treat the casting at another temperature, which may be room temperature, or another temperature in the range between room temperature and optimal heat treating temperature for the particular metal.

Thus the present invention discloses a simultaneous method for heat treating and cleaning a cast metal article having complex passageways formed utilizing the lost foam casting process. A cast metal article using the lost foam casting process is positioned in a manner so that the fluid action of a heated fluidized sand bed easily flows through the complex passageways of the cast article. In practice, the article is attached to a fixture which holds the article in position and moves the article through the heated fluidized sand bed for a fixed amount of time. The article is then removed from the sand bed, quenched and aged to form a final cast article.

Using this process, a bonded sand cluster formed during a lost foam casting process may be directly transferred from the lost foam casting flask into the heated fluidized sand bed providing significant efficiencies in the heat treatment and cleaning of the cast article.

BRIEF DESCRIPTION OF THE DRAWINGS

The drawings illustrate the best mode presently contemplated of carrying out the invention.

In the drawings:

Figure 1:
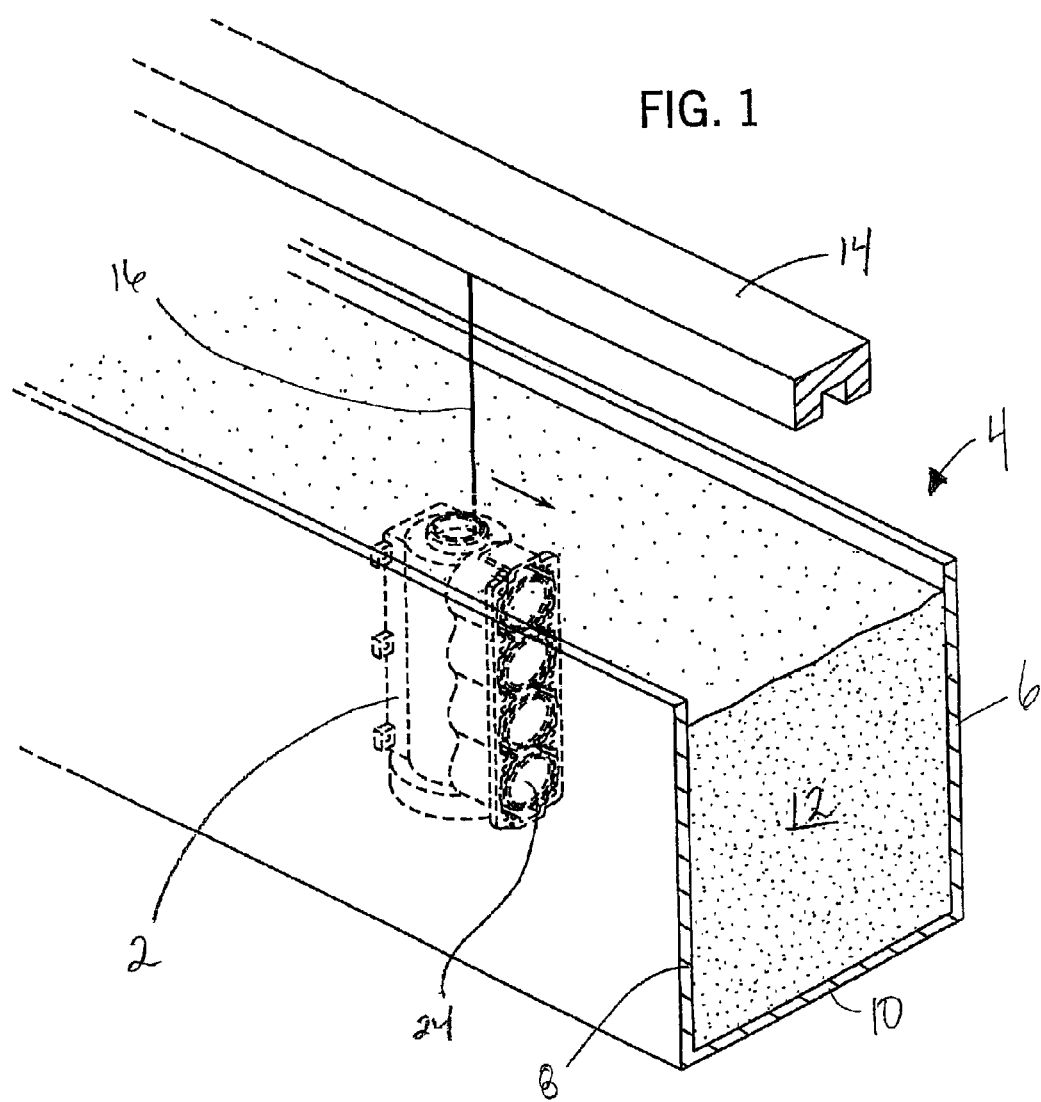

The drawings illustrate the best mode presently contemplated of carrying out the invention.

In the drawings:

FIG. 1 is a perspective view of a cast metal article moving through a heated, fluidized sand bed.

Figures 2, 3, 4, 5:
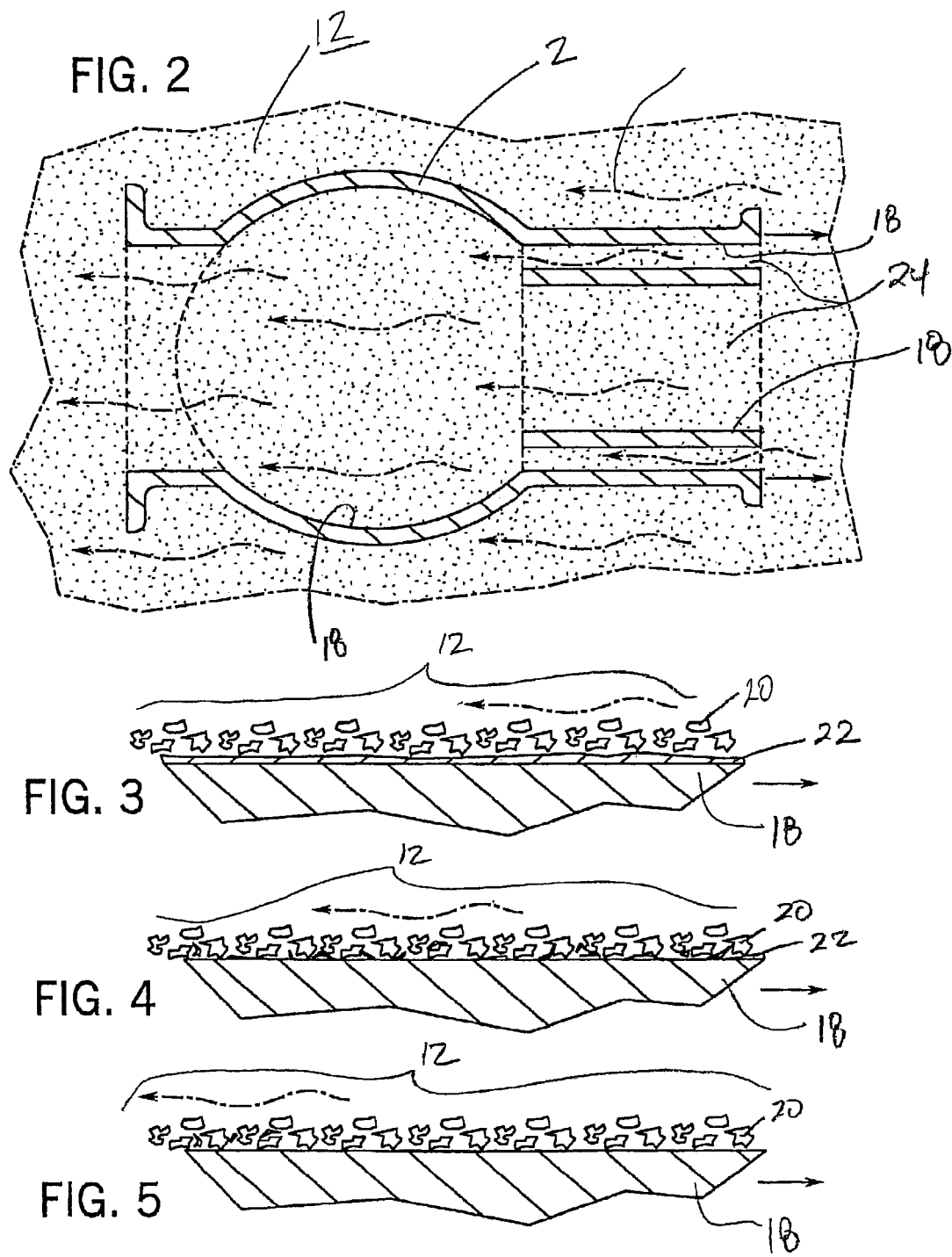

FIG. 2 is a top view of a cast metal article moving through a heated, fluidized sand bed with the metal article sectioned to demonstrate the flow of fluidized sand through passageways of the article.

FIG. 3 is a magnified view of a side wall of the cast metal article demonstrating the presence of a residual ceramic coating and movement of sand along the side wall.

FIG. 4 is a magnified view of a side wall of the cast metal article demonstrating removal of the residual ceramic coating by movement of sand along the side wall.

FIG. 5 is a magnified view of a side wall of the cast metal article demonstrating complete removal of residual ceramic coating by movement of sand along the side wall.

DETAILED DESCRIPTION OF THE INVENTION

A complex article 2 is formed by a conventional lost foam casting process. The article 2 is metal, such as an aluminum silicon alloy, and is preferably constructed of an alloy from a group consisting of aluminum association alloys 319, 356, 357, 390 or 391. The article 2 is preferably an engine block, as depicted in FIG. 1.

FIG. 1 further demonstrates the method of cleaning and of heat treating last foam castings of the current invention. A heated fluidized sand bed 4 has a first sidewall 6, a second sidewall 8, and a bottom 10. The heated fluidized sand bed is filled with silica sand 12. Preferably, the silica sand 12 is a synthetic media having a tetrahedral shape and belonging to the crystal class 4-bar 3M. Alternatively, the silica sand 12 may be angular silica sand, synthetic media having a round shape, or other similar material.

The apparatus utilized in carrying out the method of the current invention further comprises an overhead conveyance mechanism 14 which includes a series of fixtures 16 attached to the overhead conveyance mechanism 14, and further attachable to the complex article 2. A heated fluidized sand bed that may be utilized in the current invention is described in U.S. Pat. No. 6,042,369, and is incorporated by reference herein.

FIG. 2 demonstrates a top view of the complex article 2 submerged within the heated fluidized sand bed 4. Taken in combination, FIGS. 1 and 2 demonstrate the positioning of the complex article 2 within the heated, fluidized sand bed 4. The complex article 2 is positioned in a manner such that the complex passageways 24 are positioned in a direction that most benefits the fluid action of the sand 12 through the passageways 24. After the complex article 2 is in the appropriate position, the article 2 is attached to a fixture 16 that, in turn, is attached to the overhead conveyance system 14. The fixture 16 holds the complex article 2 in the position that most benefits the fluid action of the sand 12 through the passageways 24.

After the complex article 2 is attached to the fixture 16, the complex article 2 is submerged into the heated fluidized sand bed 4. The temperature of the heated fluidized sand bed varies according to the desired heat treatment of the complex article 2. For example, to heat treat a copper-free aluminum-silicon alloy, the temperature of the heated, fluidized sand bed is above 1000° F. and is preferably 1030° F. However, many articles cast using the lost foam process may not withstand such high heat treatment conditions because they are constructed of alloys having a much lower melting point. Therefore, it is contemplated that the heated, fluidized sand bed may also have a temperature in the range of 500° F. to 1000° F. for heat treating. Further, the heated, fluidized sand bed may have a temperature in the range of 300° F. to 450° F. in order to artificially age a complex cast product. Even further, the fluidized sand bed may be kept at ambient temperatures solely for cleaning purposes.

After the complex article 2 is submerged in the heated, fluidized sand bed 4, the article is moved via the overhead conveyance system 14 and fixture 16 through the sand bed for a fixed amount of time. As illustrated in FIG. 2, the article 2 is positioned in the fluidized bed 4 such that the axes of the open-ended passageways 24 are generally parallel to the direction of movement of the article through the bed so that the sand particles of the bed will scour and remove the residual ceramic coating from the surfaces bordering passageways 24. The amount of time is optimized for ductility, strength and cleaning purposes. Thus, the time is dependent upon the metal used in the complex casting 2, the torturosity of the complex passageways 24, and the amount of ceramic residue 22 remaining on the walls 18 of the complex passageways 24 from the lost foam casting process. Preferably, the amount of time for a copper free aluminum-silicon alloy engine block to move through the heated, fluidized sand bed is 30 to 45 minutes to realize the appropriate heat treating and cleaning activities of the current invention. After the complex article 2 is moved through the heated, fluidized sand bed for the fixed amount of time, the article is removed from the heated fluidized sand bed 4.

Subsequent to removal of the article 2 from the heated, fluidized sand bed 4, the article 2 may be quenched and aged. The quenching and aging process may be done in additional heated, fluidized sand beds, or may be done by conventional means. Preferably, the article 2 is quenched in a heated fluidized sand bed having a temperature in the range of 75° F. to 220° F., but may be quenched at ambient temperature. Some alloys may be quenched directly from the solution heat treating temperature to the aging temperature, thereby conserving additional thermal energy. These alloys have reduced quenched sensitivity and can achieve appropriate strength without forming stable Guinner-Preston zones at the onset of precipitation. The aging step contemplates aging the article in a heated fluidized sand bed 4 with a temperature in the range of 100° F. to 400° F., and preferably in the range of 300° F. to 400° F. It will be recognized that the amount of time and the temperature of the heated fluidized sand bed will be dictated by the construction of article 2.

As demonstrated in FIGS. 2–5, the sand 12 of the heated fluidized sand bed 4 thoroughly cleans the walls 18 of the complex internal passageways 24 of the complex cast article 2. As a result of the lost foam casting process, a ceramic coating or residue 22 remains on the walls 18 of a complex casting 2. As the casting 2 is moved through the heated fluidized sand bed 4 the individual particles of sand 20 act to remove the ceramic residue 22 from the walls 18 of the complex passageways 24. Although round silica sand has been found to effectively remove the ceramic coating 22, angular, and particularly tetrahedral shaped silica particles 20 are more efficient in removal of the ceramic residue 22.

The current invention contemplates transferring the cast article 2 to the fluidized sand bed 4 immediately after the lost foam casting process is completed. Alternately, the complex article 2 may be transferred from the lost foam casting vessel after it has cooled to ambient temperature. When an article 2 is directly transferred from a lost foam casting vessel, a bonded sand cluster surrounds the cast article 2. The bonded sand cluster is formed during the lost foam casting process when the ablated foam material, formerly constituting the pattern, enters the interstices of the sand surrounding and supporting the pattern. The ablated polymeric foam material subsequently solidifies in the interstices of the sand creating a foam and sand cluster around the newly formed article. As the cast article 2 along with the bonded sand cluster is transferred into the heated, fluidized sand bed 4, the heat of the bed 4 acts to decompose the polymeric foam material of the cluster allowing the sand to be removed from around and within the complex article 2. Importantly, the sand comprising the foam cluster is incorporated directly into the sand 12 of the heated fluidized sand bed 4. Further, directly submerging the bonded sand cluster into the heated fluidized sand bed 4 results in in situ removal of organic deposits resulting from the lost foam casting process as well as capturing any emissions trapped within the cluster. The inventive technology is therefore more "environmentally friendly" in that it reduces air pollution compared to traditional technologies.

The method of the current invention may be used to simultaneously heat treat and clean several complex cast articles. The articles are first positioned in a manner such that the complex passageways are positioned in a direction that most benefits the vertical fluid action of the heated fluidized sand bed, attaching fixtures to the complex castings to hold the articles in position and to move the articles, and submerging the articles into the same or separate heated, fluidized sand beds and moving the articles through the sand beds for a fixed amount of time. Subsequently, the complex cast articles are removed from the respective sand bed or beds and quenched in a second fluidized sand bed or by other conventional means. Further, the complex articles may be aged in yet another heated, fluidized sand bed or by conventional means. The use of multiple heated, fluidized sand beds is preferably configured such that the malfunction of one sand bed does not create a complete shut down of the heat treating and cleaning process.

It should be apparent to those skilled in the art that the method of the current invention as described herein contains several features, and that variations to the preferred embodiment disclosed herein may be made which embody only some of the features disclosed herein. For example, it may be desirable to utilize the process of the current invention without the heat treatment feature in order to effectively clean complex lost foam castings. Various other combinations, and modifications or alternatives may be also apparent to those skilled in the art. Such various alternatives and other embodiments are contemplated as being within the scope of the following claims which particularly point out and distinctly claim the subject matter regarded as the invention.

Various alternatives and embodiments are contemplated as being within the scope of the following claims particularly pointing out and distinctly claiming the subject matter regarded as the invention.

What is claimed is:

1. A method of treating a cast metal article comprising the steps of: producing a cast metal article having an internal cavity that comprises an open ended passage and having a residual ceramic coating on surfaces of the article; placing the article in a fluid bed of a finely divided inert material; providing relative movement between the article and the bed in a direction generally parallel to the axis of the passage to cause the inert material to flow into the cavity and remove the residual ceramic coating; and removing the article from the bed.

2. The method of claim 1, and including the steps of heating the bed to an elevated temperature above 500° F., and maintaining the article in the bed for a period sufficient to heat treat said metal article.

3. The method of claim 1, wherein the inert material is sand.

4. The method of claim 1, wherein the metal article is an aluminum alloy.

5. The method of claim 1, wherein the inert material is a synthetic media having a tetrahedral shape.

6. The method of claim 5, wherein the inert material is a synthetic media belonging to the crystal class 4-bar 3M.

7. The method of claim 2, and including the step of quenching the article after removal from said bed.

8. The method of claim 7, and including the step of aging the article after quenching.

9. The method of claim 8, wherein the step of quenching the article comprises quenching the article in a separate fluid bed of a finely divided inert material.

10. The method of claim 8, wherein the step of aging the article comprises aging the article in a separate fluid bed of a finely divided inert material.

11. A method of producing a heat treated cast metal article, comprising the steps of: utilizing a lost foam casting process to cast a complex metal article having at least one complex internal passage that comprises an open ended passage and having a residual ceramic coating on a surface of the article; placing the cast article in a fluidized bed of sand; heating the bed to an elevated temperature above 500° F.; providing relative movement between the article and the bed in a direction generally parallel to the axis of the passage to cause the sand to flow into the complex internal passageway and remove the residual ceramic coating; maintaining the article in the bed for a period of time to produce desired mechanical properties in the article; and removing the article from the bed.

12. The method of claim 11, wherein the metal article is an aluminum alloy.

13. The method of claim 11, and including the step of quenching the article after removal from said bed.

14. The method of claim 13, and including the step of aging the article after quenching.

15. The method of claim 13, wherein the step of quenching the article comprises quenching the article in a separate fluid bed of a finely divided inert material.

16. The method of claim 14, wherein the step of aging the article comprises aging the article in a separate fluid bed of a finely divided inert material.

17. A method of producing a heat treated metal article comprising the steps of producing a polymeric pattern having a configuration substantially identical to a cast article to be produced, said pattern having an internal cavity that comprises an open ended passage, coating the pattern with a porous ceramic coating, placing the pattern in a vessel, surrounding the pattern and filling the cavity with a first non-bonded, finely divided inert material, contacting the pattern a molten metal with the heat of the molten metal causing the polymeric pattern to vaporize and produce polymeric vapors, passing the polymeric vapors through the ceramic coating into the surrounding inert material and condensing the vapors in the inert material to produce a bonded cluster, said molten metal occupying the void created by the vaporization of the pattern, solidifying the molten metal to provide a cast article having a configuration identical to the pattern and having a residual ceramic coating on the external surface of the cast article and on a surface of the internal cavity, removing the cast article and the bonded cluster adhering thereto from the vessel, submerging the cast article and the bonded cluster in a fluidized bed of a second finely divided inert material, heating the finely divided inert material of the bed to an elevated temperature, the heat of the finely divided inert material of the bed causing the condensed polymeric vapors of the bonded sand cluster to vaporize and destroy the cluster and release the first finely divided inert material of the cluster into the second finely divided inert material of the fluidized bed, providing relative movement between the cast article and the fluidized bed to cause flow of the second finely divided inert material of the bed through the internal cavity in a direction generally parallel to the axis of the passage to remove the residual ceramic coating from the article, and maintaining the article in the heated fluidized bed for a period of time to heat treat the article.

18. The method of claim 17, wherein the first finely divided inert material disposed in the vessel is the same type as the second finely divided inert material in the fluidized bed.

19. The method of claim 17, wherein the first finely divided inert material disposed in the vessel is sand and the second finely divided inert material in the fluidized bed is a synthetic media having a tetrahedral shape.

20. The method of claim 19, wherein the second finely divided inert material is a synthetic media belonging to the crystal class 4 bar 3M.

21. The method of claim 18, wherein the finely divided inert material is sand.

22. The method of claim 17, wherein the cast article is an engine block and the molten metal is an aluminum alloy.

\* \* \* \* \*